United States Patent [19]
Bond

[11] Patent Number: 4,784,570
[45] Date of Patent: Nov. 15, 1988

[54] WINDMILL

[76] Inventor: Michael G. A. Bond, Boundary Rd., Mountain Township, Ontario, Canada

[21] Appl. No.: 129,586

[22] Filed: Dec. 7, 1987

[51] Int. Cl.$^4$ ............................................. F03D 11/02
[52] U.S. Cl. ................................ 416/170 R; 417/334
[58] Field of Search ........................... 416/170 A, 15; 417/334–336, 218

[56] References Cited

U.S. PATENT DOCUMENTS

| | | | |
|---|---|---|---|
| 527,866 | 10/1894 | Lutnes | 416/170 A X |
| 637,736 | 11/1899 | Herisson | 417/218 X |
| 841,601 | 1/1907 | Summers et al. | 417/218 X |
| 1,315,594 | 9/1919 | Cameron | 416/15 X |
| 1,639,956 | 8/1927 | Nash | 417/335 X |
| 2,555,787 | 6/1951 | D'Amelio | 416/170 A X |
| 2,688,285 | 9/1954 | Stockett et al. | 416/170 A X |
| 3,782,222 | 1/1974 | Berggren | 416/170 A X |
| 4,249,867 | 2/1981 | Cunningham | 416/170 A X |
| 4,392,785 | 7/1983 | Avery | 417/334 X |
| 4,718,825 | 1/1988 | Avery | 417/218 |

Primary Examiner—Everett A. Powell, Jr.
Attorney, Agent, or Firm—Francis W. Lemon

[57] ABSTRACT

A windmill is provided having a flywheel attached to the fan shaft and an upwardly extending crank link which is cranked by crank pin mounted off-center on the face of the flywheel. The crank link rocks a rocker beam which may, for example, actuate a pump. The crank link and pump are pivotably attached by sleeves on the rocker beam whereby the amplitude of the rocking motion imparted to the beam and the pump may be adjusted by adjusting the positin of the sleeves along the beam. Counterweights may be provided on the rocker beam for giving the crank link a pulling or a pushing function.

9 Claims, 1 Drawing Sheet

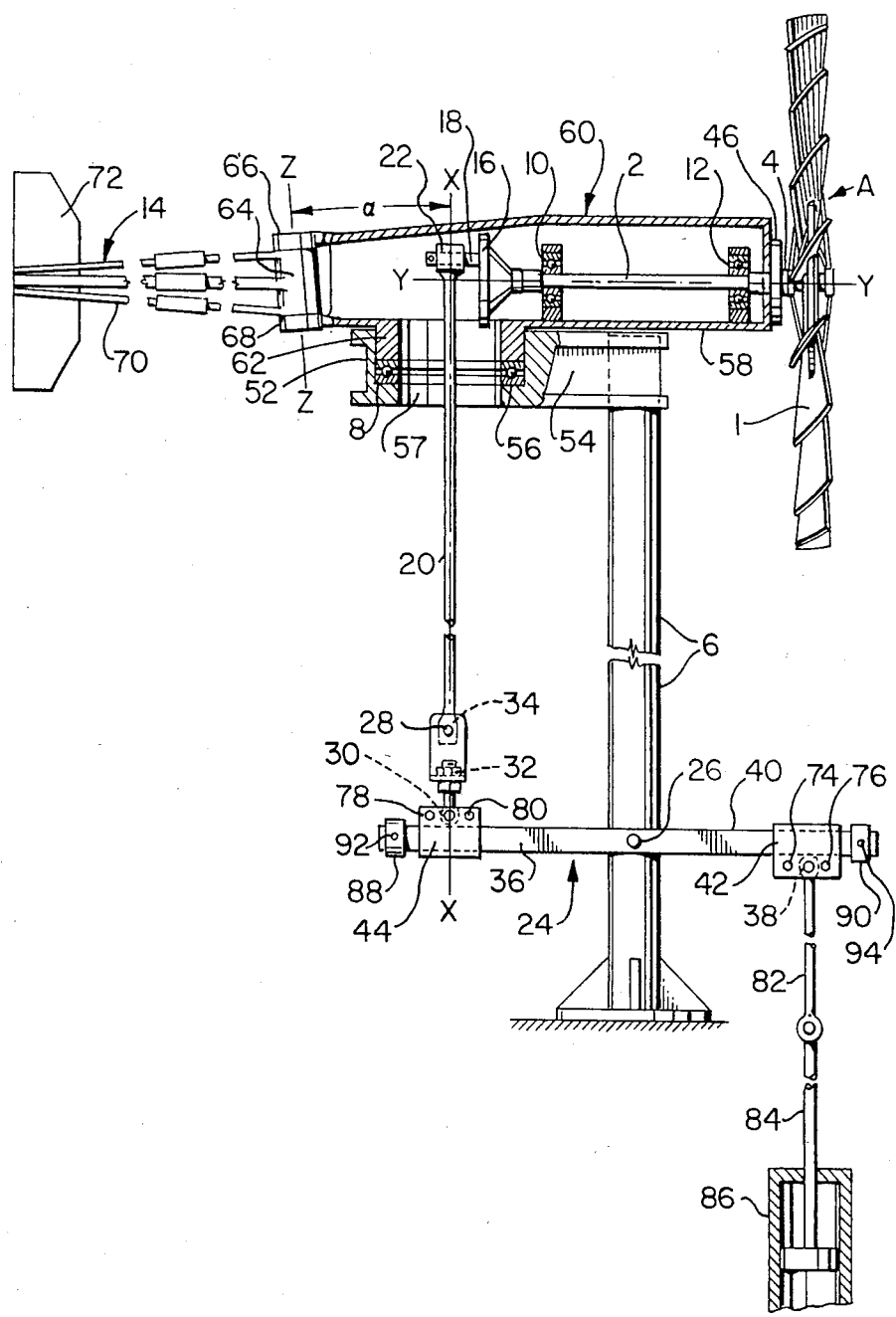

000
WINDMILL

This invention relates to a windmill.

It has already been proposed in Canadian Pat. No. 91,510, dated Feb. 14, 1905, "Windmill", H. P. Winn, to mount a windmill fan on a shaft having a crank wheel, and to reciprocate a pump actuator by means of a pitman or crank line.

While the windmill of Winn is useful, there is a need for a windmill of this type wherein the amplitude of the rocking motion transmitted by the crank link to the output, i.e. the pump actuator, can be adjusted to suit the prevailing wind speed and force required by the crank link.

According to the present invention there is provided a windmill, comprising:

(a) a windmill fan,
(b) a fan shaft having the fan mounted on the front end portion thereof for rotation therewith,
(c) an upwardly extending mast,
(d) a ring bearing mounted at an upper end of the mast for imparting relative rotation about an axis extending upwardly to one side of the mast,
(e) bearing means mounting the fan shaft on the ring bearing for rotation by the fan about a substantially horizontal axis intersecting the upwardly extending axis, while permitting the fan shaft to swivel on the ring bearing relative to the mast about the upwardly extending axis,
(f) a windmill tail assembly mounted on the ring bearing and extending rearwardly from the fan for pointing the fan into a wind,
(g) a flywheel mounted on, and substantially coextensive with, a rear end portion of the fan shaft, for rotation therewith,
(h) a crank pin mounted off center on the flywheel with respect to the axis of rotation of the fan shaft,
(i) a crank link rotatably mounted at an upper end on the crank pin and extending downwardly therefrom through the ring bearing for unobstructed crank oscillation by the crank pin,
(j) a rocker beam assembly pivotally supported at an intermediate position along the length thereof to the mast for rocking in a seesaw manner,
(k) coupling means rotatably and pivotally attaching a lower end portion of the crank link to a driven part of the rocker beam assembly whereby the rocker beam assembly may be rocked by the crank link,
(l) connecting means on a driving part of the rocker beam assembly for utilizing rocking motion thereof, and
(m) amplitude adjusting means for adjusting the amplitude of the rocking motion of the connecting means relative to that of the coupling means.

In some embodiments of the present invention the amplitude adjusting means comprises means for adjusting the connecting means along the driving part of the rocker beam assembly relative to the pivot point thereof.

In other embodiments of the present invention, the amplitude adjusting means comprises means for adjusting the coupling means along the driven part, of the rocker beam assembly relative to the pivot point thereof.

The windmill tail assembly may be pivotally attached to the ring bearing to pivot about an axis which is inclined to the vertical to swing the tail assembly upwardly to each side from alignment with the axis of rotation of the fan shaft.

The windmill tail assembly may comprise two yokes extending transversely top and bottom of a sleeve of the pivot, a cantilevered, tapering box frame may be provided comprising laterally and vertically spaced joists, an upwardly extending tail fin may be provided, the laterally and vertically spaced joists may meet at, and be attached to, the tail fin.

The joists may be in two lengthwise parts, sleeves may be provided which adjustably join the joist parts, whereby the length of the windmill tail assembly may be adjusted.

Coupling means may be provided pivotally and rotatably coupling the lower end of the crank link to the driven part of the rocker beam assembly, a first pivot may be attached to the lower end of the crank link, a yoke may be attached to the pivot for movement about an axis parallel with, and extending in the same direction as, the axis of rotation of the upper end of the crank link on the crank pin, a loose fitting swivel bolt may be attached to the yoke for relative rotation with the yoke about an upwardly extending axis, and a second pivot may be provided attaching a lower end of the swivel bolt to the driven part of the rocker beam assembly for relative rotation about an axis at right angles to the axis of rotation of the first pivot.

Two thrust collars may be provided on the fan shaft, and the bearing means mounting the fan shaft may comprise two thrust bearings which hold the thrust collars in position to prevent longitudinal movement of the fan shaft, an upwardly extending, open ended cylindrical casing may be cantilevered from an upper end of the mast by a flanged bracket integral with the casing, the ring bearing may be seated in a stepped bore portion of the casing, a shaft housing may be provided housing the fan shaft, the thrust bearings may be mounted on a base of the shaft housing, the base may have an open bored, circular, depending collar in the bore of the casing and mounting the housing on the ring bearing for swivelling the fan shaft, and the crank link may extend downwardly through the bore of the casing.

Counterweight means may be provided for adjustably counterweighting the rocker beam whereby the crank link may perform a pulling or pushing function on the rocker beam.

In the accompanying drawing which illustrates, by way of example, an embodiment of the present invention, there is shown a partially sectioned side view of a windmill.

In FIG. 1 there is shown a windmill, comprising, (a) a windmill fan 1,
(b) a fan shaft 2 having the fan 1 mounted on a front end portion 4 thereof for rotation therewith,
(c) an upwardly extending mast 6,
(d) a ring bearing 8 mounted at an upper end of the mast 6 for imparting relative rotation about an axis XX extending upwardly to one side of the mast 6,
(e) bearing means, in the form of bearings 10 and 12, mounting the fan shaft 2 on the ring bearing 8 for rotation by the fan 1 about a substantially horizontal axis YY intersecting the upwardly extending axis XX, while permitting the fan shaft 2 to swivel on the ring bearing 8 relative to the mast 6 about the upwardly extending axis XX, (f) a windmill tail assembly 14 mounted on the ring bearing 8, and extending rearwardly from the fan 1 for pointing the fan into the wind, (g) a flywheel 16 mounted on, and substantially co-extensive with, a rear end portion of the fan shaft 2, for rotation therewith, (h) a crank pin 18 mounted off-centre on the flywheel 16 with respect to the axis of rotation YY of the fan shaft 2, (i) a crank link 20 rotatably mounted at an upper end 22 on the crank pin 18 and extending downwardly therefrom through the ring bearing for unobstructed crank oscillation, by the crank pin 18, (j) a rocker beam assembly, generally designated 24, pivotally supported, by a pivot 26, at an intermediate position along the length thereof for rocking in a seesaw (teeter totter) manner, (k) coupling means, in the form of first and second pivots 28 and 30 and a loose fitting swivel bolt in a yoke 33, rotatably and pivotally attaching a lower end portion 34 of the crank link 20 to a driven part 36 of the rocker beam assembly 24, whereby the rocker beam assembly 24 may be rocked by the crank link 20, (l) connecting means, in the form of pivot 38, on a driving part of the rocker beam assembly 24 for utilizing rocking motion thereof, and (m) amplitude adjusting means, in the form of adjustable sleeves 42 and 44 on the rocker beam assembly 24, for adjusting the amplitude of the rocking motion of the connecting means to suit the wind speed, in the form of pivot 38, relative to that of the coupling means, in the form of pivots 28 and 30 and swivel 32.

The fan 1 is provided with a drum brake 46 on the fan shaft 2 for preventing rotation of the fan 1 when it is not in use.

The fan shaft is provided with thrust collars 48 and 50 and the bearings 10 and 12 are thrust bearings which hold the thrust collars 48 and 50 in position and prevent longitudinal movement of the fan shaft 2.

It should be noted that the first pivot 28 has an angle of rotation parallel with, and extending in the same direction as, the axis of rotation of the upper end of the crank link 20 on the crank pin 18, and the axis of rotation of the second pivot 30 is at right angles to the axis of rotation of the first pivot 28.

An upwardly extending, open ended cylindrical casing 52 is cantilevered from the upper end of the mast 6 by a flanged bracket 54 integral with the casing 52. The ring bearing 8 is seated in a stepped bore portion 56 of the bore 57 of the casing 52, and the bearings 10 and 12 are mounted on the base 58 of a shaft housing 60. The base 58 has an open bored, circular, depending collar 62, in the bore 57 of the casing 52, which mounts the housing on the ring bearing 8 for swivelling the fan shaft 2 about the axis XX. The crank link 20 extends downwardly through the bore 57.

The windmill tail assembly 14 is connected by a pivot 64 to the housing 60. The pivot 64 pivots the assembly 4 about an axis ZZ which is inclined at an angle X of about 15° to the axis XX so that the assembly will swing slightly upwardly in both lateral directions from alignment with the axis of rotation of the fan shaft 2. The assembly 14 has two yokes 66 and 68 extending transversely top and bottom of the sleeve of the pivot 64, a cantilevered, tapering box frame 70 comprising laterally and vertically spaced joists which meet at an upwardly extending tail fin 72 to which the joists are attached. The joists are in two lengthwise parts which are adjustably joined by sleeves 73 to adjust the length of the assembly 14.

The sleeves 42 and 44 are U-shaped and are clamped to the beam assembly 24 by bolts 74, 76 and 78, 80, respectively, which are loosened and moved along the beam assembly to adjust the amplitude of the rocking motion of the beam assembly 24. This movement is taken up by the loose fitting swivel 32.

In this embodiment the pivot 38 on the driving part of the rocker beam assembly 24 is connected by a link 82 to the piston rod 84 of a well pump 86.

Counterweight means may be provided in the form of one of the counterweights 88 and 90, slidable along the beam assembly 24 and secured thereon by screw 92 or 94, for adjustably counterweighting the beam assembly 24 so that the crank link with either performs, in operation, a pulling or pushing function thereon.

In operation, with the fan 1 pointed by the tail assembly 14 at a wind moving in the direction of arrow A and the brake 46 released, the fan 1 is rotated by the wind in a clockwise direction when viewed in the direction of arrow A.

The rotation of the fan 1 is transmitted to the flywheel 16 by the fan shaft 2, which cranks the crank link 20 to reciprocate. The crank link 20 rocks the beam assembly 24 which in turn reciprocates the link 82 thus actuating the pump 86.

Windmills according to the present invention may be used, for example, for pumping liquids, operating air compressors, operating agricultural machinery or saws.

In different embodiments of the present invention, the driven and driving parts of the rocker beam assembly 24 are portions of the rocker beam assembly 24 situated on the same side of the pivot 26, and an adjustable counterweight is on the opposite side of the rocker beam assembly 24 thereto. The driven and driving parts may be the arms of a bifurcated end portion of the rocker beam assembly 24.

I claim:

1. A windmill, comprising:

(a) a windmill fan, (b) a fan shaft having the fan mounted on a front end portion thereof for rotation therewith, (c) an upwardly extending mast, (d) a ring bearing mounted at an upper end of the mast for imparting relative rotation about an axis extending upwardly to one side of the mast, (e) bearing means mounting the fan shaft on the ring bearing for rotation by the fan about a substantially horizontal axis intersecting the upwardly extending axis, while permitting the fan shaft to swivel on the ring bearing relative to the mast about the upwardly extending axis, (f) a windmill tail assembly mounted on the ring bearing, and extending rearwardly from the fan for pointing the fan into a wind, (g) a flywheel mounted on, and substantially coextensive with, a rear end portion of the fan shaft, for rotation therewith, (h) a crank pin mounted off-center on the flywheel with respect to the axis of rotation of the fan shaft, (i) a crank link rotatably mounted at an upper end on the crank pin and extending downwardly therefrom through the ring bearing for unobstructed crank oscillation, by the crank pin, (j) a rocker beam assembly pivotally supported at an intermediate position along the length thereof to the mast for rocking in a seesaw manner, (k) coupling means rotatably and pivotally attaching a lower end portion of the crank link to a driven part of the rocker beam assembly, whereby the rocker beam may be rocked by the crank link, (l) connecting means on a driving side of the rocker beam assembly for utilizing rocking motion thereof, and (m) amplitude adjusting means for adjusting the amplitude of the rocking motion transmitted by the rocker beam from the crank link to the connecting means.

2. A windmill according to claim 1, wherein the amplitude adjusting means comprises means for adjusting the connecting means along the driving part of the rocker beam assembly relative to the pivot point thereof.

3. A windmill according to claim 1, wherein the amplitude adjusting means comprises means for adjusting the coupling means along the driven part of the rocker beam assembly relative to the pivot point thereof.

4. A windmill according to claim 1, wherein the windmill tail assembly is pivotally attached to the ring bearing to pivot about an axis which is inclined to the vertical to swing the tail assembly upwardly to each side from alignment with the axis of rotation of the fan shaft.

5. A windmill according to claim 4, wherein the windmill assembly comprises two yokes extending transversely top and bottom of a sleeve of the pivot, a cantilevered tapering box frame comprising laterally and vertically spaced joists, an upwardly extending tail fin, the laterally and vertically spaced joists meeting at, and being attached to, the tail fin.

6. A windmill according to claim 5, wherein the joists are in two lengthwise parts, sleeves are provided which adjustably join the joist parts, whereby the length of the windmill tail assembly may be adjusted.

7. A windmill according to claim 1, wherein the coupling means pivotally and rotatably coupling the lower end of the crank link to the driven part of the rocker beam assembly comprises, a first pivot attached to the lower end of the crank link, a yoke attached to the pivot for movement about an axis parallel with, and extending in the same direction as, the axis of rotation of the upper end of the crank link on the crank pin, a loose fitting swivel bolt attached to the yoke for relative rotation with the yoke about an upwardly extending axis, and a second pivot attaching a lower end of the swivel bolt to the driven part of the rocker beam assembly for relative rotation about an axis at right angle to the axis of rotation of the first pivot.

8. A windmill according to claim 1, wherein two thrust collars are provided on the fan shaft, and the bearing means mounting the fan shaft comprises two thrust bearings which hold the thrust collars in position to prevent longitudinal movement of the fan shaft, an upwardly extending, open ended cylindrical casing is cantilevered from an upper end of the mast by a flanged bracket integral with the casing, the ring bearing is seated in a stepped bore portion of the casing, a shaft housing houses the fan shaft, the thrust bearings are mounted on base of the shaft housing, the base has an open bored, circular, depending collar in the bore of the casing and mounting the housing on the ring bearing for swivelling the fan shaft, and the crank link extends downwardly through the bore of the casing.

9. A windmill according to claim 1, wherein counterweight means are provided for adjustably counterweighting the rocker beam whereby the crank link may perform a pulling or pushing unction on the rocker beam.

* * * * *